United States Patent [19]
Proffitt

[11] Patent Number: 4,936,718
[45] Date of Patent: Jun. 26, 1990

[54] ROTARY CUTTER AND ASSOCIATED METHOD

[76] Inventor: Jimmie L. Proffitt, 11905 W. Kingsgate Rd., Concord, Tenn. 37922

[21] Appl. No.: 221,931

[22] Filed: Jul. 20, 1988

[51] Int. Cl.[5] .................... B23C 5/06; B23C 5/24
[52] U.S. Cl. ............................ 407/36; 407/40; 407/58; 407/61
[58] Field of Search ............. 407/31, 34, 35, 36, 407/38, 39, 40, 44, 46, 58, 61

[56] References Cited

U.S. PATENT DOCUMENTS

| | | | |
|---|---|---|---|
| 1,043,225 | 11/1912 | Haas | 407/40 |
| 1,376,972 | 5/1921 | Runde | 407/38 |
| 1,914,411 | 6/1933 | Earl | 407/35 |
| 1,927,409 | 9/1933 | Markstrum | 407/35 |
| 1,938,773 | 12/1933 | Ernst et al. | 407/39 |
| 2,081,639 | 5/1937 | Perry et al. | 407/34 |
| 4,211,507 | 7/1980 | Kress et al. | 407/40 |
| 4,456,408 | 6/1984 | Glasow | 407/35 |
| 4,547,100 | 10/1985 | Naccarato et al. | 407/46 |

*Primary Examiner*—William Terrell
*Attorney, Agent, or Firm*—Luedeke, Hodges & Neely

[57] ABSTRACT

A face milling cutter for holding a plurality of cemented tool bits for rotation about an axis and an associated method utilize a body of material defining a shank portion securable within a rotatable spindle of a machine tool for rotation about an axis and an insert-accepting body portion within which the tool bits are supported. The insert-accepting body portion is generally cylindrically in shape and joined to the shank portion so that the longitudinal axis of the body portion coincides with the axis of rotation of the cutter. Furthermore, the body portion defines a plurality of radially outwardly-opening recesses extending along the length of the cylindrical periphery of the body portion. Each recess is adapted to accept the shank of a tool bit so that when operatively positioned therein, the tool bit shank extends generally longitudinally of the cutter body portion. Moreover, the recesses are positioned in such a relationship to the rotational axis of the cutter so that the cutting tips of bits operatively positioned within the recesses are positioned at staggered, or alternative, distances from the rotational axis of the cutter. The method of the invention includes the steps involved in setting and staggering the cutting depths of the cutting bits in the cutter.

9 Claims, 2 Drawing Sheets

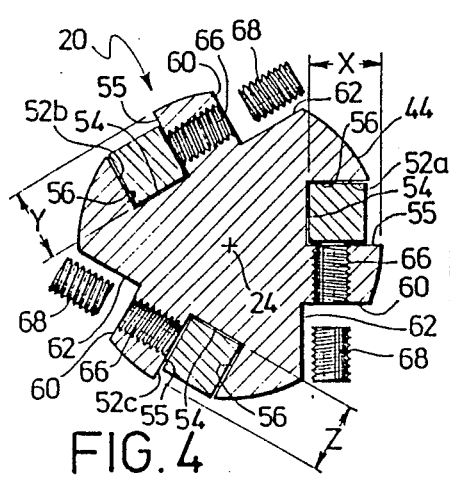
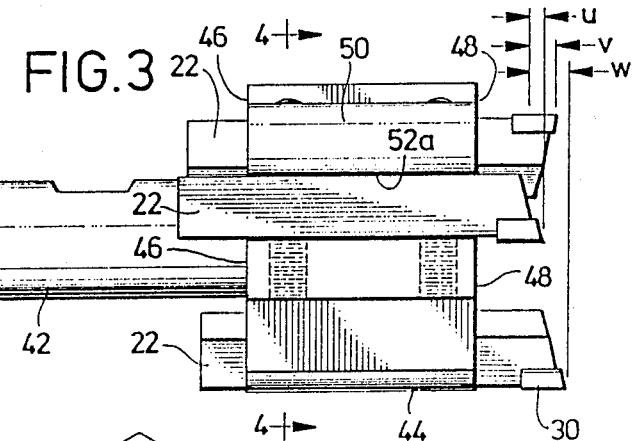
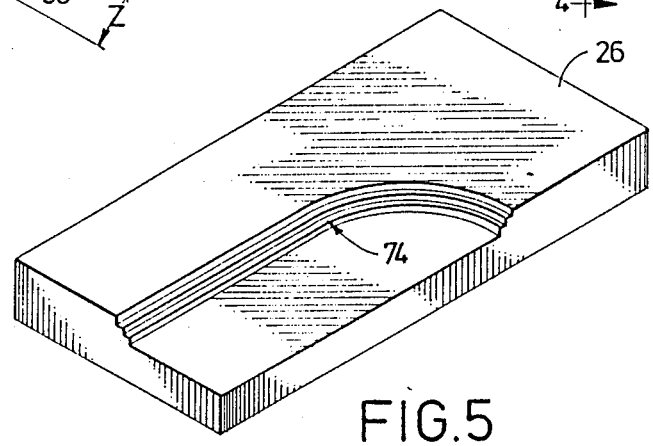
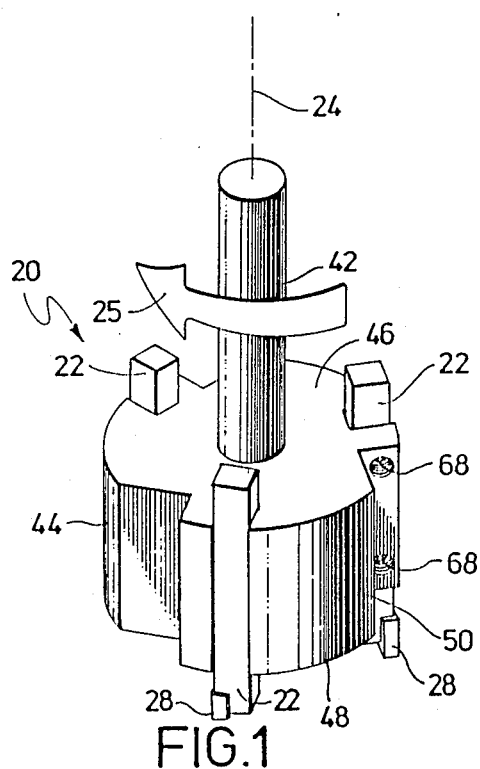
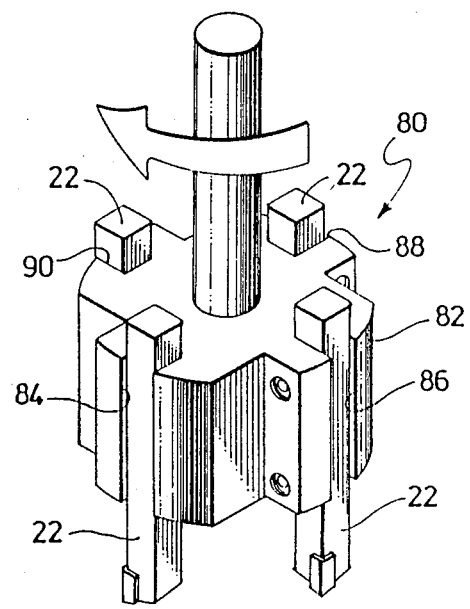

ROTARY CUTTER AND ASSOCIATED METHOD

BACKGROUND OF THE INVENTION

This invention relates generally to cutting tools for working upon metal workpieces and relates more particularly to a rotary face milling cutter for high speed metal removal.

The type of face milling cutter with which this invention is concerned commonly includes a body securably to a machine spindle or the like for rotation about an axis and which is adapted to hold within the body of the cutter at least one cutting tool or insert for rotation about the axis. As the cutter is operatively rotated and moved in cutting engagement across the face of a workpiece in a direction generally perpendicular to the rotational axis, the cutting tool held within the body cuts away portions of the workpiece. One such cutter, commonly known as a flycutter, is adapted to hold only a single cutting tool. Another such cutter is adapted to hold a plurality of cutting tools wherein the cutting tools operate in different planes and different radii. For example, the cutting tools positioned adjacent one another within the cutter body are held therein so that the cutting edges thereof rotate at different radii about the rotational axis and in different rotational planes. Consequently, the radial and axial stepping of the cutting tools provide a series of cutting edges which follow one another and remove in sequence portions of the workpiece so that a "stepped" cut is defined therein. Examples of the latter described type of cutters are shown and described in U.S. Pat. Nos. 4,586,855 and 3,329,065.

It is an object of the present invention to provide a new and improved face milling cutter for holding a plurality of cutting bits and an associated method.

Another object of the present invention is to provide such a cutter for removing stock from metal workpieces at a relatively high rate of speed.

Still another object of the present invention is to provide such a cutter suitable for use at relatively high rates of rotation.

A yet still another object of the present invention is to provide such a cutter utilizing cutting tools which can be removed from or replaced within the cutter with relative ease.

A further object of the present invention is to provide such a cutter which can be operated at relatively low cost.

A still further object of the present invention is to provide such a cutter capable of rapidly removing relatively large amounts of metal from a workpiece while the temperature of the workpiece does not appreciably elevate.

A yet still further object of the present invention is to provide such a cutter accommodating an adjustment in the cutting depth of each bit mounted in the cutter.

One more object of the present invention is to provide a method for setting and staggering the cutting depth of the cutting bits mounted in such a cutter.

SUMMARY OF THE INVENTION

This invention resides in a face milling cutter and associated method for holding a plurality of tool bits for rotation about an axis wherein each tool bit is of a type having an elongated shank and a cutting tip fixedly attached to the bit shank for effecting a cut in a workpiece when moved in cutting engagement therewith.

The cutter of the invention is comprised of a shank portion securable within a rotatable spindle for rotation of the cutter about a rotational axis and an insert-accepting portion operatively joined to the shank portion. The shank portion includes a plurality of recesses in a surface of the body portion wherein each recess is adapted to accept a corresponding tool bit so that when operatively positioned therein, the tool bit shank extends generally longitudinally of the cutter body portion. The recesses are positioned in such a relationship to the rotational axis of the cutter so that when the tool bits are operatively accepted by the recesses of the insert-accepting portion, the cutting tip of each bit is positioned at a distance from the rotational axis of the cutter which is different from the distance at which the cutting edge of an adjacent bit is located from the rotational axis.

The method of the invention includes the steps involved in setting and staggering the cutting depths of a plurality of tool bits within the cutter of this invention. Such steps include the providing of a machine tool with a rotatable spindle, operatively securing the shank portion of the cutter within the rotatable spindle and providing a table having a surface. The machine tool and table are then positioned in such a relationship with one another that the longitudinal axis of each bit shank positioned within the cutter is oriented generally perpendicular to the table surface and so that the cutter is spaced from the table. The table and machine tool spindle are then moved relative to one another until the distance between the cutter and table surface corresponds with the desired cutting depth of a first bit positioned within a preselected one of the recesses wherein the desired cutting depth of the first bit represents the shallowest of a series of preselected staggered cutting depths. The first bit is then shifted longitudinally of the cutter until the cutting tip of the first bit engages the table surface and then secured in position along the length of the cutter. The table surface and machine tool are then moved away from one another until the distance between the cutter and table surface corresponds with the desired cutting depth of a second bit positioned within a preselected one of the recesses wherein the desired cutting depth of the first bit represents the next-to-shallowest of a series of preselected staggered cutting depths. The second bit is then shifted longitudinally of the cutter until the cutting tip of the second cutting bit engages the table surface and then secured in position along the length of the cutter.

BRIEF DESCRIPTION OF THE DRAWING FIGURES

FIG. 1 is a perspective view of an embodiment of a face milling cutter in accordance with the present invention and a cutting bits operatively mounted within the cutter;

FIG. 3 is a side elevation view of the FIG. 1 cutter;

FIG. 4 is a cross-sectional view taken about on lines 4—4 of FIG. 3 shown exploded.

FIG. 5 is a perspective view of a workpiece which has been operated upon the FIG. 1 cutter;

Figure 6:
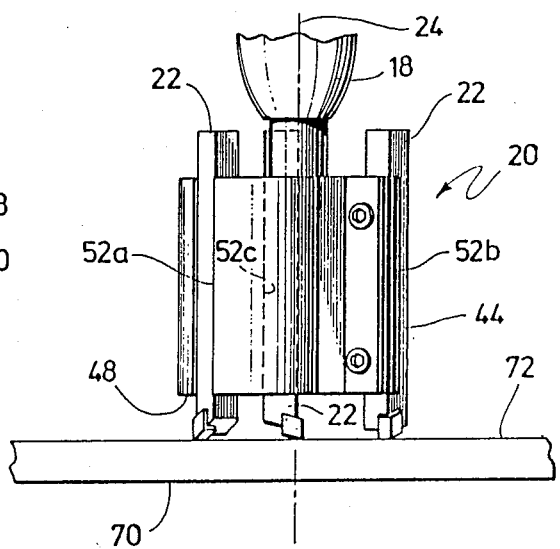
Figure 7:
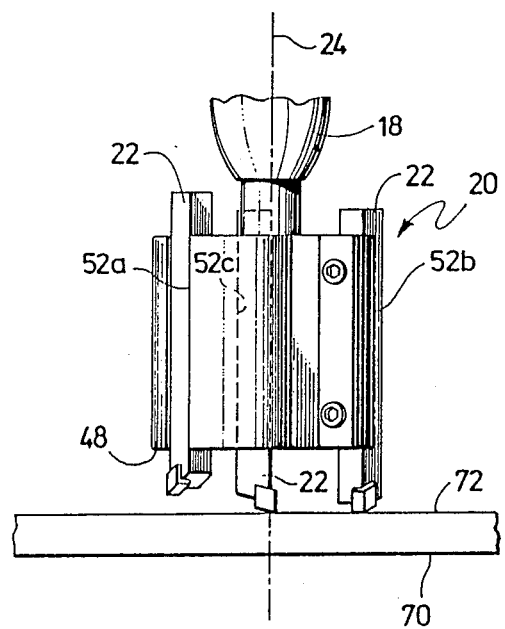
Figure 8:
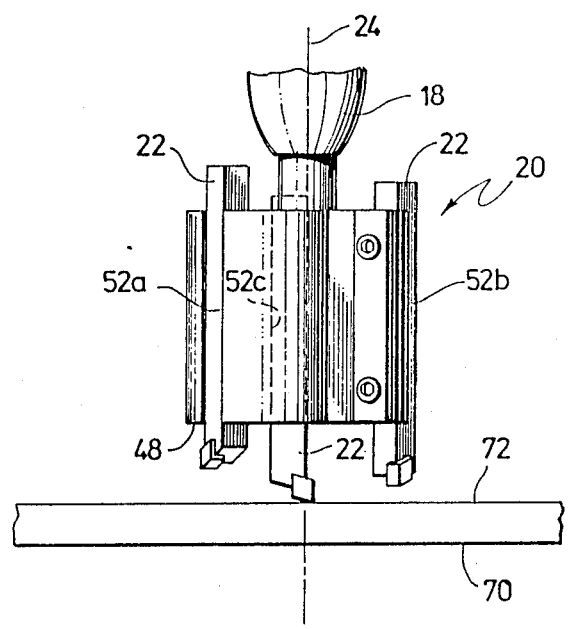

FIGS. 6–8 fragmentary side elevational views of the FIG. 1 cutter shown operatively mounted within a machine tool and illustrating the steps involved in positioning the depth of cut of each cutting bit mounted therein; and FIG. 9 is a perspective view of another embodiment of a face milling cutter in accordance with the cutter of the present invention.

Figure 10:
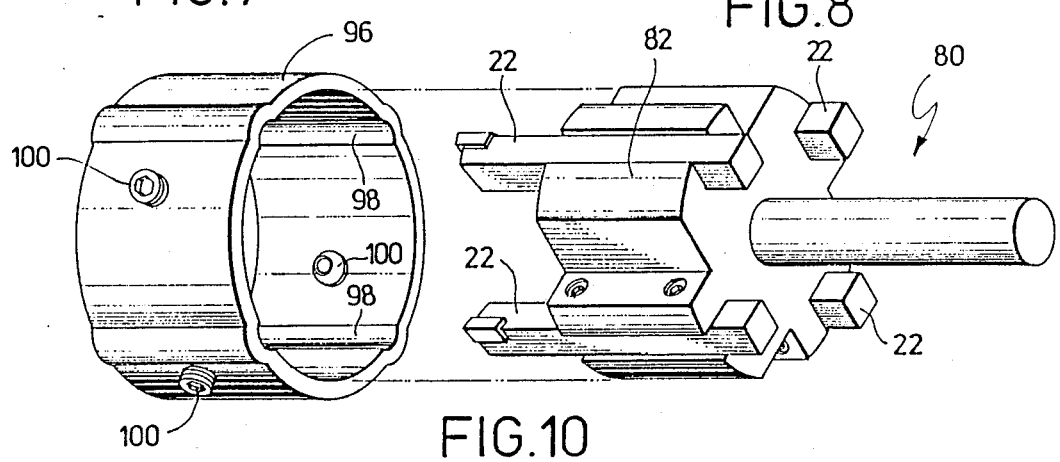

FIG. 10 is a perspective view of the FIG. 9 embodiment and a ring-like member for securement thereabout.

DETAILED DESCRIPTION OF THE ILLUSTRATED EMBODIMENTS

Turning now to the drawings in greater detail and considering first FIG. 1, there is illustrated an embodiment of a face milling cutter, generally indicated 20, in accordance with the cutter of the present invention and three identical cutting bits 22 shown operatively supported within the cutter 20. The cutter 20 is adapted to be secured to a rotatable device, such as a rotatable spindle 18 (FIGS. 6-8) of a machine tool, for rotation about a working or rotational axis 24 in the direction of the arrow 25. The cutter bits 22 are each, in turn, supported by the cutter 20 so that as the cutter 20 is operatively rotated by the machine tool spindle 18 and urged into operative cutting engagement with a workpiece 26 (FIG. 5), the cutting edges of the bits 22 sequentially remove portions of the face of the workpiece 26.

Figure 2:
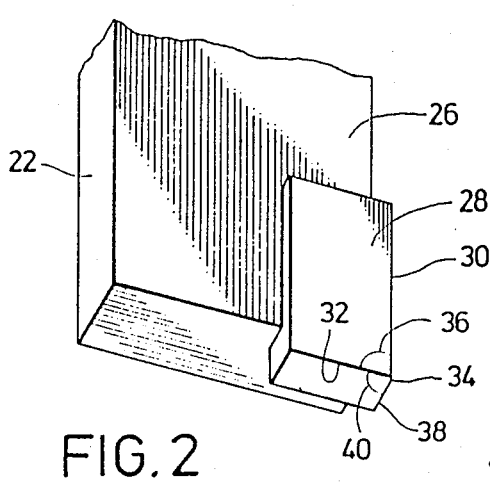
FIG. 2 is a perspective view of a fragment of one of the cutting in FIG. 1.

With reference to FIG. 2, each cutting bit 22 supported within the cutter 20 is of a type commonly known as a cemented square tool bit. Such a bit 22 includes a shank 26 constructed of hot rolled tool steel and a carbide cutting tip 28 fixedly secured, or cemented, to one end of the shank 26. The shank 26 of the bit 22 is elongated in shape and appropriately notched or shaped at one end thereof for accepting a portion of the cutting tip 28. As best shown in FIG. 2, the tip 28 defines cutting edges 30 and 32 which meet at an apex 34. Each bit 22 is intended to be moved into cutting engagement with a workpiece so that either of the cutting edges 30 or 32 remove material of the workpiece. While cutting edge 30 is oriented somewhat parallel to the longitudinal axis of the bit shank 26, the cutting edge 32 forms an acute angle 36 (i.e., less than 90 degrees) with the cutting edge 30. Still further, the cutting tip 28 defines a third, or trailing edge 38 which joins the apex 34 and which forms an acute angle 40 with the cutting edge 32.

With reference to FIGS. 1, 3 and 4 and in accordance with the cutter of the present invention, the face milling cutter 20 includes a steel shank portion 42 for securement of the cutter 20 within the rotatable spindle 18 (FIGS. 6-8) and a steel insert-accepting body portion 44 within which the cutting bits 22 are supported. The shank portion 42 is of cylindrical shape and adapted to be releasably secured within a rotatable spindle so that the longitudinal axis of the shank portion 42 coincides with the axis of rotation 24 of the cutter 20. By way of example, the shank portion 42 is adapted to be releasably secured within the holder or collet of a Bridgeport-type milling machine.

The insert-accepting body portion 44 is fixed at one end, or the lower end as viewed in FIG. 1, to the shank portion 42 for rotation therewith about the axis 24. The body portion 44 is generally cylindrical in shape so as to define two opposite and parallel end surfaces 46, 48 and a generally cylindrical periphery or surface 50 extending therebetween. In accordance with the cutter of the present invention, the body portion 44 defines three elongated recesses 52a, 52b, and 52c which extend longitudinally of the body portion 44 and between the end surfaces 46 and 48. As best viewed in FIG. 4, each recess 52a, 52b or 52c opens generally radially outwardly of the shank portion 42 and is of such shape and size to accept the shank portion of a corresponding cutting bit 22. Still further and as best viewed in FIG. 4, each defined recess 52a, 52b or 52c defines a back wall 54 and opposite side walls 55 and 56. As is apparent herein, the back wall 54 and side wall 56 provide surfaces against which the shank portion 42 of a bit 22 is adapted to engage when the bit 22 is operatively positioned within the recess.

In accordance with the cutter of the present invention, the depth of each recess 52a, 52b or 52c as measured from the cylindrical surface 50 to the back wall 54 is different from the recess depth of every other recess of the body portion 44. More specifically, a first one 52a of the recesses possesses a preselected depth X (FIG. 4) and every other recess 52b and 52c in the body portion 44 possesses a depth Y or Z, respectively, which is deeper than that of the first recess 52a. Furthermore, each recess 52b and 52c possesses a deeper depth than its preceding recess when the recesses 52a, 52b, and 52c are considered in sequence in a counterclockwise direction, as viewed in FIG. 4 and in a direction opposite the direction of intended rotation of the cutter 20. For example and for utilizing cutting bits 22 having shanks of about 0.375 inches square, the depth X of the first recess 52a is about 0.35 inches, the depth Y of the second recess 52b is about 0.385 inches and the depth Z of the third recess 52c is about 0.395 inches. Such a difference in recess depth permits the cutting edges 30 of the cutting bits 22 to be positioned at different distances, or radii, from the rotational axis 24 wherein the first cutting edge 30 of the bit 22 positioned in the first recess 52a is positioned farthest from the rotational axis 24.

With reference still to FIGS. 1, 3 and 4, the cutter 20 includes means for releasably securing the cutting bits 22 within the recesses 52a, 52b and 52c. To this end, such means for securing includes a plurality of set screws 68 and the body portion 44 defines internally-threaded openings 66 within which the set screws 68 are received. Furthermore and as best shown in FIG. 4, the body portion 44 defines a series of notches in the cylindrical periphery 50 wherein each notch defines a pair of side walls 60 and 62 extending longitudinally of the body portion 44 and which are disposed generally at a right angle with one another. Each defined notch is associated with a corresponding one of the recesses 52a, 52b, or 52c so that the side wall 60 of each notch is arranged generally parallel to the side wall 55 of the corresponding recess 52a, 52b, or 52c.

Each set screw 68 defines a headed end and an abutment end for abutting the shank portion of a bit 22 when the bit 22 is operatively positioned within its corresponding recess 52a, 52b or 52c. More specifically and in order to operatively secure each bit 22 within its corresponding recess, each set screw 68 is appropriately positioned within its corresponding threaded aperture 66 so that its abutment end does not interfere with the positioning of the bit 22 within the corresponding recess. The bit 22 is then positioned within its corresponding recess so that the bit shank abuts the back wall 54 and side wall 56 of the corresponding recess. The set screws 68 are then subsequently tightened so that the bit 22 is securely held within its corresponding recess between the abutment end of the screw 68 and the side wall 56 of the recess.

It will be understood that because each recess 52a, 52b and 52c extends between opposite end surfaces of the body portion 44, each bit 22 is permitted to be slidably moved relative to and along the length of its corresponding recess to accommodate an adjustment in the spacing between the tip 28 of each bit 22 and the cutter end surface 48 and thereby effect an adjustment in cutting depth of the bit cutting edge 32. Such an adjustment in cutting depth, of course, must be made before the set screws 68 are finally tightened against the shank of the bit 22.

In accordance with the cutter of the present invention, the cutting bits 22 are positionable within the recesses 52a, 52b, 52c of the body portion 44 so that the cutting tip apexes 34 of the cutting bits 22 are arranged in alternative radial planes of the cutter body portion 44, or in parallel planes oriented perpendicular to the rotational axis 24 of the cutter 20. In the cutter 20 and bit 22 combination of FIG. 1, the apex 34 of the bit 22 positioned in the first, or shallowest, recess 52a is positioned closest to the cutter shank portion 42 while the apex 34 of the bit 22 positioned in the third recess 52c is positioned farthest from the shank portion 42. The apex 34 of the bit 22 positioned in the second recess 52b is positioned in a radial plane of the cutter 20 intermediate of the radial planes in which the apexes 34 of the other two bits 22 are located. Hence, the positions of the bit apexes 34 are staggered in sequence from the bit 22 positioned in the first recess 52a to the bit 22 positioned in the deepest recess 52c so that the apexes 34 operate in different rotational planes. Therefore, the cutting tip 28 positioned within the first cutting recess 52a and thereby adapted to provide the greatest radius of cut in a workpiece 26 (FIG. 5) is also adapted to provide the shallowest depth of cut.

During an operation with the cutter 20, the cutter 20 is rotated about the rotational axis 24 and moved across the face of a workpiece 26 (FIG. 5) so that the cutting tip 28 of each bit 22 cuts away stock of the workpiece 26 from the remainder thereof. With the bits 22 mounted within the cutter 20 in a staggered condition as aforedescribed, the edge of a cut defined in the workpiece 26 and indicated generally 74 in FIG. 5 is stepped so as to provide a stair-step appearance. If desired, the bits 22 can be adjusted to a position along the length of the cutter 20 so that the cross-sectional area of the amount of stock required to be removed by each cutting bit 22 during a single pass of the cutter 20 across the workpiece 26 is about the same as that required to be removed by every other bit 22 mounted within the cutter 20.

To adjust the position of the cutting bits 22 longitudinally of the cutter 20 and thereby adjust the depth of cut of the bit edges 30 and 32, the cutter shank portion 42 is fixedly secured within the rotatable spindle 18 of a machine tool as illustrated in FIG. 6 and positioned above the surface 72 of a table 70 which is movable toward and away from the cutter 20 and the spindle 18. The cutter 20 is arranged in such a relation to the table 70 that the end surface 48 of the cutter body portion 44 generally faces the table surface 72 and so that its longitudinal axis is oriented generally perpendicular thereto. The table 70 is then adjusted in position relative to the cutter 20 and spindle 18 until the distance between the cutter 20 and table surface 72 corresponds to the desired cutting depth of the bit 22 positioned in the first recess 52a, or the shallowest recess as measured from the cylindrical surface of the body portion 44. At that point, the set screws 68 are then adjusted so that every bit 22 positioned in the cutter 20 is permitted to move longitudinally thereof. The bit 22 positioned within the first recess 52a is then moved toward the table 70 until the cutting tip 28 of the bit 22 engages the table surface. The set screws 68 associated with the bit 22 mounted within the first recess 52a are thereafter tightened to fixedly secure the bit 22 in position within the recess 52a.

With reference to FIG. 7, the table 70 is then adjusted in position, or lowered as viewed in FIG. 7, relative to the cutter 20 and spindle 18 until the distance between the cutter end surface 48 and table surface corresponds to the desired cutting depth of the bit 22 positioned in the second recess 52b. The bit 22 of the second recess 52b is then moved or shifted longitudinally of the cutter 20 until its cutting tip 28 engages the table surface. The corresponding set screws 68 are thereafter tightened to fixedly secure the bit 22 of the second recess 52b in position therein.

With reference to FIG. 8, the table 70 is thereafter re-adjusted, or lowered, in position relative to the cutter 20 and spindle 18 until the distance between the cutter end surface 48 and corresponds to the desired cutting depth of the bit 22 positioned in the third recess 52c, or the deepest recess as measured from the cylindrical periphery of the cutter body portion 44. The bit 22 of the third recess 52c is then moved longitudinally of the cutter body 44 until its cutting tip 28 engages the table surface 72. The bit 22 of the recess 52c is thereafter fixedly secured in position by appropriate tightening of the corresponding set screws 68. It follows that the bits 22 are thereby set for operation in different radial planes and at different radii.

For purposes of illustration and with reference again to FIG. 3, the depths of cut of the bits 22 of the cutter 20 are provided here as follows: the depth U of cut of the bit 22 mounted within the first recess 52a is about 0.015 inches; the depth V of cut of the bit 22 mounted within the second recess 52b is about 0.030 inches; and the depth W of cut of the bit 22 mounted within the third recess 52c is about 0.035 inches. By limiting the difference in the depth of cut between the bits 22 mounted within the second and third recesses 52b, 52c (i.e., the deepest and next-to-deepest recesses) to about 0.005 inches, it has been found that a relatively smooth finish is defined across the workpiece 26 (FIG. 5) as the cutter 20 is operatively moved in cutting engagement thereacross.

It has also been found that the cutter 20 is capable of removing large quantities of stock from a workpiece at a rapid rate of speed. More specifically, the cutter 20 has been found to be effective at removing workpiece stock while the cutter 20 is rotated at relatively high rates of rotation, such as, for example, 1,000–1,200 rpm. At the same time, it has been found that the temperature of the workpiece from which the stock is being rapidly removed by the cutter 20 does not appreciably elevate.

Still another advantage provided by the cutter 20 relates to the reduction of machine tool vibrations during a face milling operation with the cutter 20. By comparison, a rotary face milling cutter or flycutter which commonly includes only a single cutting bit for removal of workpiece stock is apt to generate unwanted vibrations in the spindle or machine tool, and such unwanted vibrations are believed to be due, at least in part, to the intermittent contact between the single cutting bit of the cutter and workpiece upon rotation of cutter. Since the cutter 20 holds a plurality of cutting bits 22 about the body portion 44, at least one cutting bit 22 is normally in cutting engagement with the workpiece at any point in time during an entire revolution of the cutter 20.

It will be understood that numerous modifications and substitutions can be had to the aforedescribed embodiments without departing from the spirit of the invention. For example, although the cutter 20 of FIGS. 1, 3, 4 and 6–8 have been shown and described as adapted to support three cutting bits in a regularly spaced arrangement about the cutter body portion 44, a cutter in accordance with the present invention may include an alternative number of bits. For example, there is illustrated in FIG. 9 a cutter 80 adapted to support four cutting bits 22. To this end, the cutter 80 includes a body portion 82 defining four recesses 84, 86, 88 and 90 having different depths as measured from the cylindrical periphery of the body portion 82. For supporting four cutting bits 22 wherein each bit 22 is 0.375 inches square in cross section, the cutter body portion 82 has a diameter of 2.975 inches and the recesses 84, 86, 88 and 90 possess depths as measured from the cylindrical periphery of the body portion 82 of 0.375 inches, 0.395 inches, 0.415 inches and 0.437 inches, respectively.

Still further, a ring-like member can be provided for securement about the body portion of the cutter and the bits positioned therein to enhance the safety of the cutter in use. For example and with reference to FIG. 10, there is shown a ring-like member 96 adapted for securement about the cutter 80 and bits 22 of FIG. 9. The ring-like member 96 is somewhat sleeve-like in form and has a length as measured from end-to-end which is about equal to the length of the body portion 82. When operatively positioned about the body portion 82, the ring-like member 96 is positioned in the phantom-line condition of FIG. 10. Furthermore, and to accommodate portions of the bit shank edges which may protrude radially outwardly of the body portion recesses, there are defined along the inner surface of the ring-like member 96 a plurality of shank-accepting grooves 98 extending along the length of the member 96. The ring-like member 96 is releasably securable about the body portion 82 by means of four set screws 100 regularly spaced about the member 86. Accordingly, the aforedescribed embodiments are intended for purposes of illustration and not as limitation.

What is claimed is:

1. A face milling cutter for supporting a plurality of tool bits for high-speed rotation about an axis wherein each tool bit is of a type having an elongated shank and a cutting tip fixedly attached to the bit shank for effecting a cut in a workpiece when operatively moved in cutting engagement therewith, said cutter comprising:

a shank portion securable within a rotatable spindle of a machine tool for rotation about a rotational axis;

a generally cylindrically-shaped insert-accepting body portion joined to said shank portion and defining a plurality of recesses in the cylindrical surface of said body portion, said body portion having a diameter which is small enough to accommodate cutter rotational speeds in excess of 1000 rpm, each recess adapted to accept the shank of a tool bit so that when operatively positioned therein, the tool bit shank extends generally longitudinally of the cutter body portion, the recesses being positioned in such a relationship to the rotational axis of the cutter so that when the tool bits are operatively accepted by said recesses, the cutting tips of the bits are positioned at a staggered distances from the rotational axis; and means associated with the body portion for fixedly securing each cutting bit within a corresponding recess;

each body portion recess defining a radially outwardly-facing first abutment wall and a second abutment wall oriented at substantially a right angle to the first abutment wall, each pair of recess abutment walls providing abutment surfaces against which the shank of a bit is positioned when the bit is operatively inserted within the recess and wherein the first abutment walls of the recesses are spaced from the rotational axis at different distances so that by inserting the bits within the recesses so that the shank of each bit is positioned against the corresponding pair of recess abutment walls, the cutting tips of the bits are positioned at the desired staggered distances from the rotational axis;

said body portion defining a plurality of internally-threaded, two-ended apertures which each have an end in communication with a corresponding recess and another end which is open to provide access thereto and oriented at a right angle to the second abutment wall of the corresponding recess, and said means for fixedly securing each bit within a corresponding recess includes a set screw threadably received by said aperture so that by tightening each set screw against a cutting bit operatively positioned within a corresponding recess, the bit is tightly held between the set screw and the second abutment wall of the recess.

2. A cutter as defined in claim 1 further comprising:

a ring-like member for encircling said body portion and the shank of each tool bit operatively positioned within the recesses of said body portion and means for releasably securing said ring-like member about said body portion and the bit shanks positioned therein.

3. A cutter as defined in claim 1 wherein said recesses are regularly spaced about the cylindrical periphery of said body portion.

4. A cutter as defined in claim 3 further comprising:

a ring-like member for encircling said cylindrical body portion and the shank of each tool bit operatively positioned within the recesses of said body portion and means for releasably securing said ring-like member about said body portion and the bit shanks positioned therein to reduce any likelihood that the bit shanks will be thrown radially outwardly by the rotation of said body portion during use of said cutter.

5. A cutter as defined in claim 1 wherein each of said recesses is adapted to accommodate a longitudinal adjustment in position of a bit operatively positioned within the recess to thereby accommodate an adjustment in cutting depth of the bit.

6. A cutter assembly for a high-speed face milling operation comprising:

a plurality of tool bits each including an elongated shank and a cutting tip fixedly attached to the bit shank for effecting a cut in a workpiece when operatively moved in cutting engagement therewith; and a cutter including means defining a shank portion securable within the rotatable spindle of a machine tool for rotation about a rotational axis and a generally cylindrically-shaped insert-accepting body portion joined to said shank portion, said body portion having a diameter which is small enough to accommodate cutter rotational speeds in excess of 1000 rpm and defining a plurality of bit-accepting recesses in the cylindrical surface of said body portion, each bit being positioned within a corresponding recess so that each tool bit shank extends generally longitudinally of the cutter body portion, said recesses being positioned in such a relationship to the rotational axis of the cutter so that the cutting tips of the bits are positioned at staggered distances from the rotational axis, said cutter further including means associated with the body portion for releasably securing each cutting bit within a corresponding recess, each body portion recess defining a radially outwardly-facing first abutment wall and a second abutment wall oriented at substantially a right angle to the first abutment wall, each pair of recess abutment walls providing abutment surfaces against which the shank of a corresponding bit is positioned and wherein the first abutment walls of the recesses are spaced from the rotational axis at different distances so that with the shank of each bit being positioned against the corresponding pair of recess abutment walls, the cutting tips of the bits are positioned at the desired staggered distances from the rotational axis, said body portion defining a plurality of internally-threaded, two-ended apertures which each have an end in communication with a corresponding recess and another end which is open to provide access thereto and generally oriented at a right angle to the second abutment wall of the corresponding recess, and said means for releasably securing each bit within a corresponding recess includes a set screw threadably received by said aperture and tightened against a corresponding cutting bit so that the bit is tightly held between the set screw and the second abutment wall of the recess.

7. The assembly of claim 6 wherein each of said tool bits is a cemented-type of bit wherein the cutting tip of each bit is cemented to one end of the bit shank.

8. The assembly of claim 6 wherein said recesses are regularly spaced about the cylindrical surface of said body portion.

9. The assembly of claim 6 wherein and each of said recesses is adapted to accommodate a longitudinal adjustment in position of the bit positioned therein to thereby accommodate an adjustment in cutting depth of the bit cutting tip.

* * * * *